(12) United States Patent
Brunheroto et al.

(10) Patent No.: US 6,665,266 B1
(45) Date of Patent: Dec. 16, 2003

(54) METHOD AND APPARATUS FOR MULTIPLEXING A MULTITUDE OF SEPARATE DATA STREAMS INTO ONE SHARED DATA CHANNEL, WHILE MAINTAINING CBR REQUIREMENTS

(75) Inventors: Jose R. Brunheroto, Hawthorne, NY (US); Frans Laemen, Ossining, NY (US); Julio Nogima, White Plains, NY (US); Frank A. Schaffa, Hartsdale, NY (US); William J. Anzick, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,334

(22) Filed: Nov. 23, 1999

(51) Int. Cl.[7] .................................................. H04J 3/14
(52) U.S. Cl. ........................ 370/232; 370/442; 370/532
(58) Field of Search ................................. 370/232, 229, 370/230, 231, 235, 252–253, 321–324, 336, 337, 345, 347, 389, 392, 395.1, 396–397, 395.4, 395.43, 395.62, 395.64, 395.7, 400–401, 412–414, 428, 437, 442, 449–450, 453, 457–459, 462, 465, 468, 477, 498, 503, 508–509, 516–519, 535, 537–540, 541, 521

(56) References Cited

U.S. PATENT DOCUMENTS

| 4,750,168 | A | | 6/1988 | Trevitt ........................ 370/442 |
|---|---|---|---|---|
| 5,020,052 | A | * | 5/1991 | DePrycker et al. ......... 370/232 |
| 5,640,388 | A | | 6/1997 | Woodhead et al. ......... 370/468 |
| 5,719,858 | A | | 2/1998 | Moore ........................ 370/347 |
| 5,757,800 | A | | 5/1998 | Ishikawa et al. ............ 370/441 |
| 5,757,807 | A | | 5/1998 | Tezuka et al. ............... 370/541 |
| 5,790,543 | A | | 8/1998 | Cloutier ...................... 370/252 |
| 5,825,766 | A | * | 10/1998 | Kobayashi et al. .... 370/395.64 |
| 6,052,379 | A | * | 4/2000 | Iverson et al. .............. 370/442 |
| 6,226,264 | B1 | * | 5/2001 | Shibata et al. .............. 370/232 |
| 6,490,298 | B1 | * | 12/2002 | Chin et al. .................. 370/532 |

* cited by examiner

Primary Examiner—Douglas Olms
Assistant Examiner—Brian Nguyen
(74) Attorney, Agent, or Firm—Scully, Scott, Murphy & Presser; Douglas W. Cameron, Esq.

(57) ABSTRACT

Transport packet multiplexing system and methodology that provides accurate bandwidth control, allowing bandwidth requirements to vary per multiplexed data stream while guaranteeing bandwidth availability. Accurate timing control is provided by implementing a real-time scheduling mechanism for adjusting the timing information based upon timing information obtained at the time of multiplexing to accurately represent environmental changes.

17 Claims, 5 Drawing Sheets

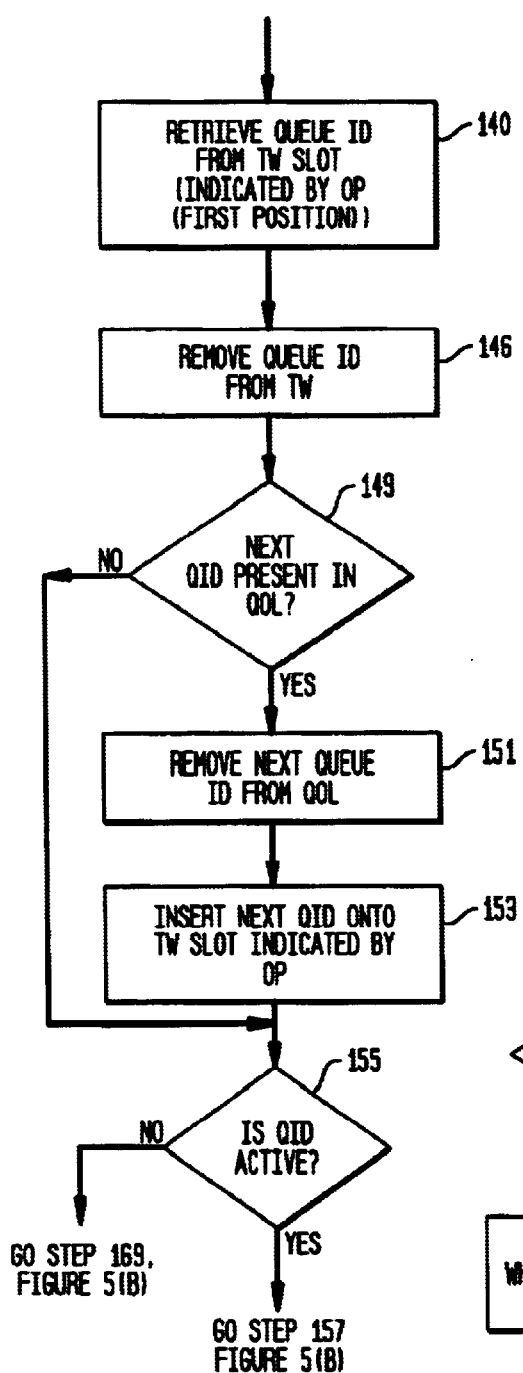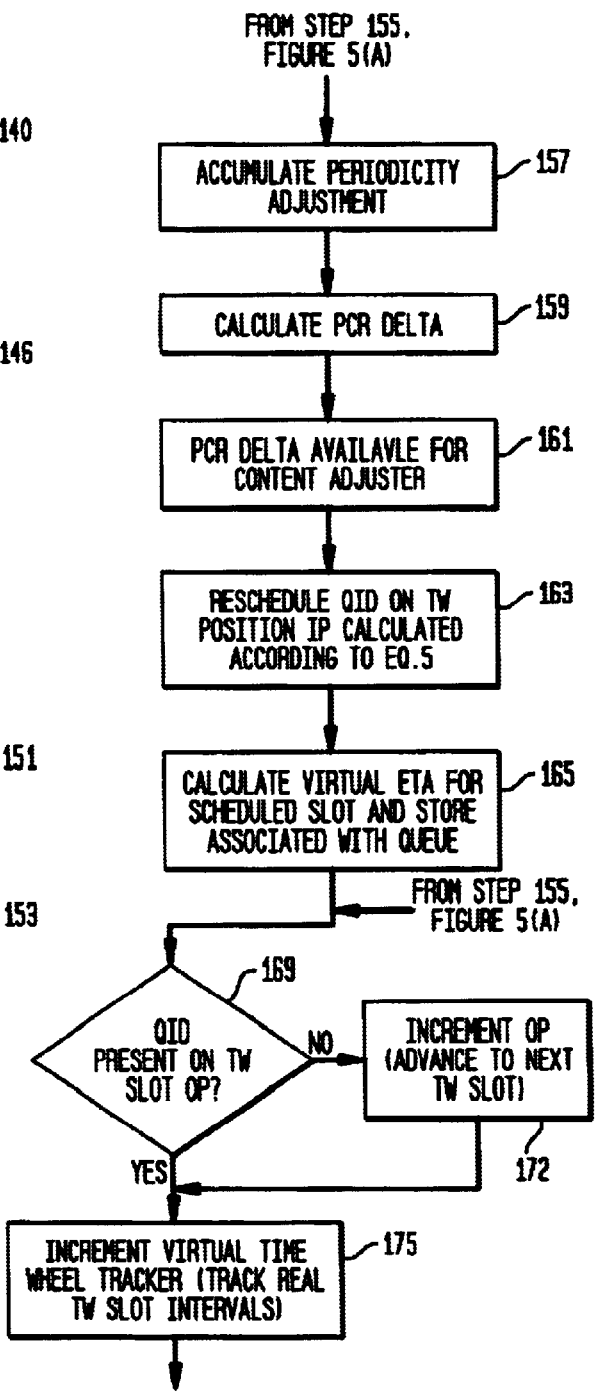

METHOD AND APPARATUS FOR MULTIPLEXING A MULTITUDE OF SEPARATE DATA STREAMS INTO ONE SHARED DATA CHANNEL, WHILE MAINTAINING CBR REQUIREMENTS

BACKGROUND OF THE INVENTION

1. Field of the Invention

The present invention relates generally to systems and methods for multiplexing data streams comprising MPEG encoded data, and particularly, to a system and method for multiplexing Constant Bit Rate (CBR) encoded multimedia content for transmission over a shared fixed bit-rate data channel.

2. Discussion of the Prior Art

In a broadcast environment where systems such as the MPEG-II Transport Stream (TS) defined by the ISO/IEC 13818 are used, one transmitter, often referred to as video server, typically is connected to a large quantity of receivers also referred to as clients. Implementing such an environment requires complex processing schemes, such as MPEG-II encoding and large scale buffering defined in ISO/IEC 13818-2 and ISO/IEC 13818-3 to be present prior to the transmitter to allow the receiver to be implemented using a relatively simple decoding process and small buffers. Supporting a small buffer in the receiver requires a sophisticated transmission bit rate control mechanism such as Constant Bit Rate (CBR) to be implemented at the video server to control data flow and prevent receiver buffer underflow or overflow.

When a transmission system, such as said MPEG-II TS, utilizes Time Division Multiplexing (TDM) as a means to multiplex a multitude of CBR data sources into a shared fixed bit rate medium, additional requirements arise. Requirements such as fixed guarantee bandwidth allocation, real-time content header and payload updates reflecting the alteration of the environment caused by the difference in bit rate between program stream and data channel demand accurate calculations, while cost consideration drives for simple implementation utilizing relative cheap devices. Moreover, the presence of accurate time stamp information, such as the Program Clock Reference (PCR) defined in the ISO/IEC 13818-1 standard, within the transmitted data stream requires an accurate update when re-multiplexing this stream to the required bit rate.

Systems that perform TDM functions are well known in the art. Many of these, such as U.S. Pat. No. 4,750,168, U.S. Pat. No. 5,757,800, and U.S. Pat. No. 5,757,807 describe systems that enable several analog sources to share a common analog communication channel. This requires all analog sources to comply with the required parameters such as transmission bandwidth of the communication channel. The channel is equally shared, assigning equal bandwidth allocation to each dedicated source according to a fixed interval round-robin scheme.

Systems such as described in U.S. Pat. No. 5,719,858 that implement TDM for digital applications, allow all sources to compete for the available bandwidth of the channel. While the sources in these-systems gain performance by increasing bandwidth, systems implementing the MPEG-II TS standard may overflow the receiving buffer if the allocated bandwidth per data stream is not strictly controlled.

Systems such as U.S. Pat. No. 5,640,388 and U.S. Pat. No. 5,790,543 detect and subsequently correct timing information contained in the transmitted data channel.

It would be highly desirable to provide a multiplexing system that provides accurate bandwidth control, allowing bandwidth requirements to vary per multiplexed data stream while guaranteeing availability of allocated bandwidth.

SUMMARY OF THE INVENTION

It is an object of the present invention to provide a transport packet multiplexing system that provides accurate bandwidth allocation, allowing bandwidth requirements to vary per multiplexed data stream while guaranteeing bandwidth availability.

Another object of the invention is to provide a multiplexing system that includes accurate timing control by implementing a real-time scheduling mechanism for adjusting time representations carried within the stream based upon timing information obtained at the time of multiplexing, to accurately represent transmission time alterations.

It is yet another object of the invention to provide a multiplexing system for multiplexing MPEG-II transport packets onto a digital communications channel, providing all digital sources with their specific bandwidth requirements by assigning an appropriate amount of time slots for each data source.

It is a further object of the invention to provide an optimized TDM system utilizing low cost devices capable of performing a few initial accurate calculations in software for simplifying all further calculations and thus, ensuring performance of the remaining real-time scheduling process, maintaining the required accuracy level.

According to the present invention, there is provided a system and method for multiplexing transport packets associated with one or more data sources for transmission over a shared fixed bit rate medium, at least-one data source required to transmit packets at an associated Constant Bit Rate (CBR), the method including: storing transport packets associated with a data source within a data queue memory storage device associated with a respective data source, each data queue memory device having an associated queue identifier (QID); maintaining timing information comprising plurality of time intervals and scheduling a time interval for each QID having a transport packet to be multiplexed on the shared medium based on a required CBR for the data source and the fixed bit rate medium; tracking in real-time time intervals associated with the fixed bit rate and determining from a current time interval a scheduled transport packet associated with the QID to be multiplexed; determining a time offset indicating a difference between the scheduled time interval for the transport packet and an actual time of multiplexing the transport packet; and, updating the timing information for a next transport packet to be multiplexed from the associated QID based on the determined time offset and an associated CBR of the data source.

Advantageously, all real-time devices in the system of the invention may be implemented in either hardware or software depending upon performance requirements and maximum supported data rate.

BRIEF DESCRIPTION OF THE DRAWINGS

Further features, aspects and advantages of the apparatus and methods of the present invention will become better understood with regard to the following description, appended claims, and accompanying drawings where:

FIGS. 5(a) and 5(b) depict a flow chart illustrating the parsing of a transport packet performed by the de-multiplex system of the invention.

DETAILED DESCRIPTION OF THE PREFERRED EMBODIMENT

Figure 1:
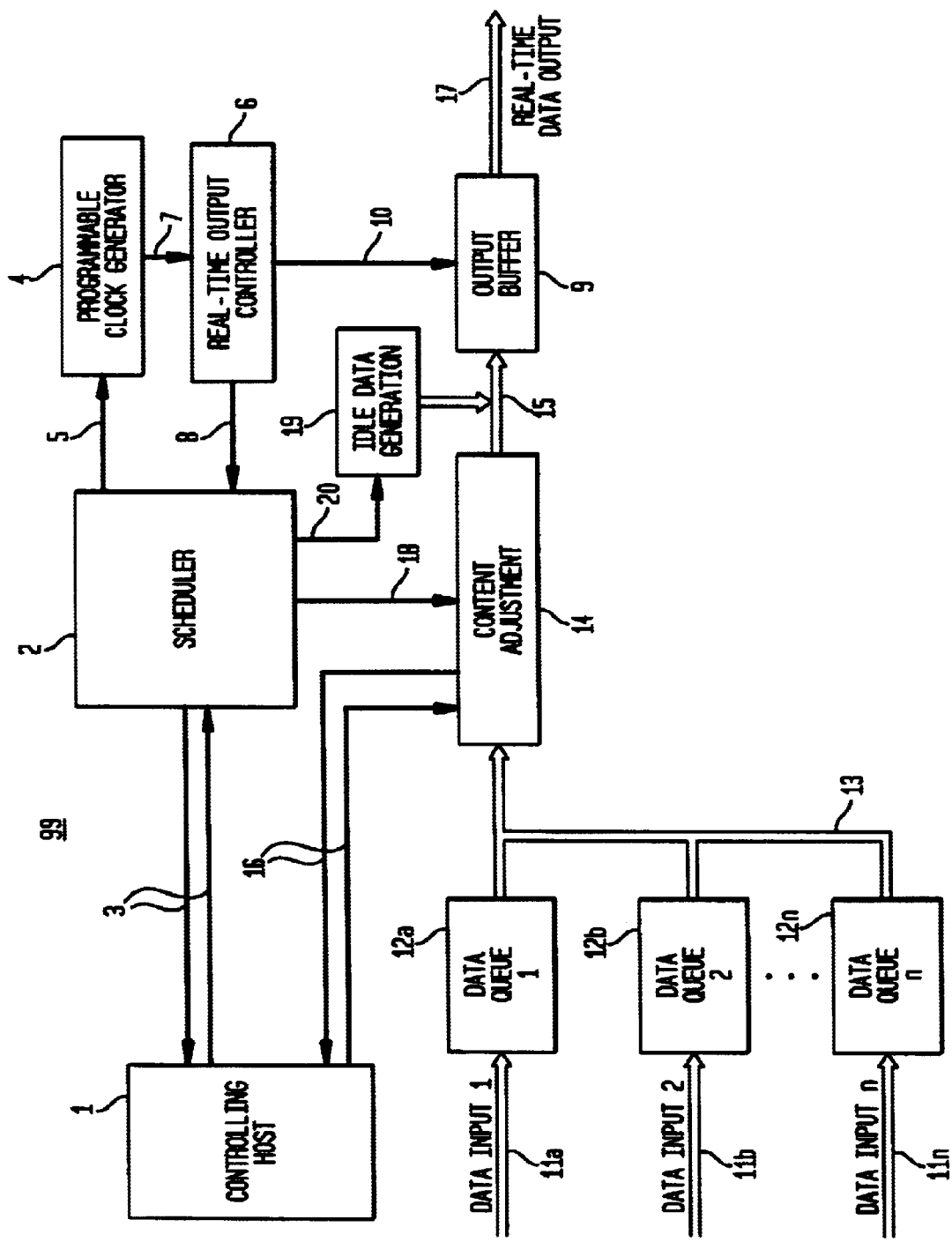
FIG. 1 is a diagram illustrating the flow and control for the TDM demultiplexing system of the invention.
Figure 2:
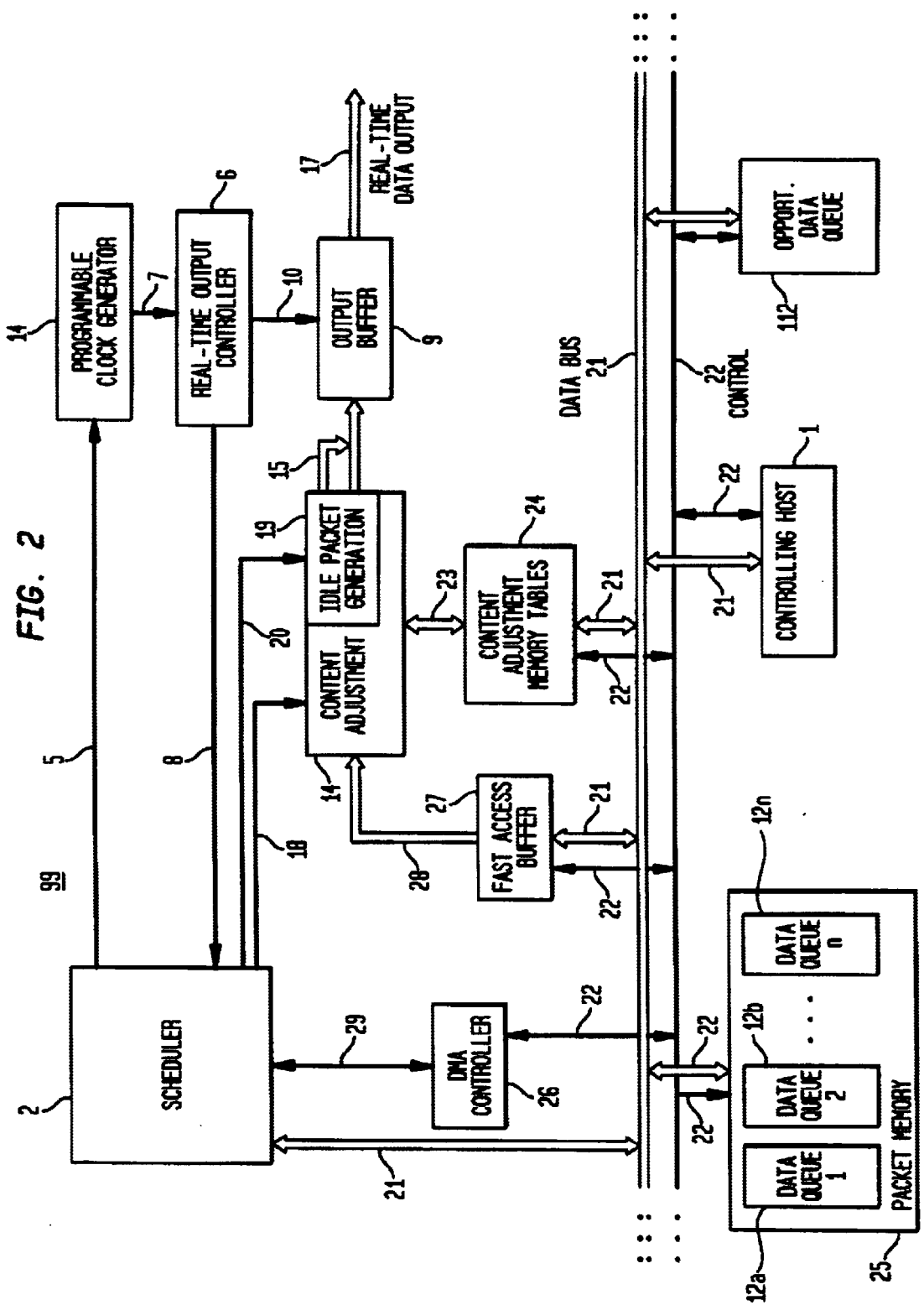
FIG. 2 is a functional block diagram depicting the preferred implementation of the system of FIG. 1.

FIGS. 1 and 2 illustrate the real-time multiplexing system of the invention for providing multiplexed data content from a variety of sources for transmission output over a transport channel (17) having an associated Channel Bit Rate (ChBR). As shown in FIG. 1, data streams from a plurality of data sources (not shown) are segmented into fixed length packets and transported from separate Data Sources (not shown) over respective Data Input connections (11a, . . . ,11n) to respective assigned Data Queues labeled (12a, . . . ,12n). Each packet is a Fixed Packet Size (FPS), e.g., 188 bytes, in accordance with the MPEG-II Transport Stream protocol. Further, all Data Sources representing a Data Stream are identified by a Data Queue Identifier also referred to as "QID." As shown in FIG. 1, for each Data Input 11a, . . . ,11n connection there is an associated dedicated bus (11) present, however, it is understood that a Shared Data Bus (21) structure, shown in FIG. 2, may be implemented for data input and output to/from the Data Queues (12a, . . . ,12n) without changing functionality. That is, in an embodiment implementing a unidirectional data flow, the Shared Data Bus configuration could easily be converted into two separate data busses, one for read access and one for write access, without changing the functionality. Whatever data bus structure implemented, proper transmission capacity must be ensured without resulting in an empty Data Queue (12a, . . . ,12n).

FIG. 2 further illustrates buffers associated with data queues (12a, . . . ,12n) located in a Packet Memory (25) having a total bandwidth sufficient to support at least twice the required aggregated ChBR plus additional overhead, to support both reading from and writing to the separate Data Queues (12a, . . . ,12n). Every Data Source upon initialization is dynamically assigned a unique QID, referring to a Data Queue (12a, . . . ,12n) residing in the Packet Memory (25). The required Data Queue (12a, . . . ,12n) size depends upon the CBR and burstiness of the arriving data stream for that specific Data Queue (12a, . . . ,12n), therefore, each Data Queue (12a, . . . ,12n) may have a different Data Queue size. The size of the Packet Memory (25) thus, is a function of the maximum number of active data sources at any given time, the maximum Data Queue (12a, . . . ,12n) size, and the maximum aggregated output ChBR.

As further shown in FIG. 2, a real-time DMA Controller (26) and a small Fast Access Buffer (27) large enough to hold at least one transport packet are shown connected to the Shared Data Bus (21). In the manner to be explained in greater detail herein, upon request from a Scheduler device (2) via control lines (22 29), the real-time DMA Controller (26) initiates transfer of a next packet from the Data Queue (12a, . . . ,12n) indicated by the scheduled QID to the Fast Access Buffer (27) via bus (21). Note that the only functionality of the DMA controller (26) and Fast Access Buffer (27) is to ensure real-time access to the next scheduled packet. As further shown in FIG. 2, a second buffer referred to as the Output Buffer (9) is provided, which, preferably, is large enough to hold several transport packets for multiplexed output thereof over real-time transport channel (17). Data content is provided to the Output Buffer (9) either from the Fast Access Buffer (27) over data buses 21 and 28 according to control signals 22 or, directly from the Data Queue (12a, . . . ,12n) residing in the Packet Memory (25) via the intermediary of a content adjustment block (14) over data bus 13 according to control signals 16. Thus, between the Fast Access Buffer (27) and Output Buffer (9), any changes to transferred Transport Packets required by the TDM may be made, for example, with content provided by content adjustment memory tables 24 which provides content to adjustment block 14 over buses 21, 23 operating under control lines 22. If no QID is assigned, no transfer from a Data Queue (12a, . . . ,12n) to the Fast Access Buffer (27) is initiated, and, therefore, no packet is transferred to the Fast Access Buffer (27). At this time, an IDLE packet, as defined in the ISO/IEC 13818 standard may be inserted into the output data stream by the IDLE Packet Generator (19) into the Output Buffer (9) via bus 15, if required by the specified physical layer. Alternately, as will be explained, "opportunistic" data may be inserted into the output data stream provided by a special dedicated opportunistic data queue (112) when no QID transport packet is scheduled.

In FIGS. 1 and 2, a Real-Time Output Controller (6) provides a signal (10) to enable the Output Buffer (9) to transmit the appropriate amount of data in the appropriate time, depending upon the physical layer characteristics. Particularly, the Real-Time Output Controller (6) is capable of creating any ChBR, derived from the Clock Signal (7) received from the Programmable Clock Generator (4) which is preset by the Scheduler (2) via signal line (5). As shown in FIG. 1, the Scheduler (2) receives the ChBR information upon channel initialization from the Controlling Host (1) through a Host Interface (3)

FIGS. 1 and 2 further illustrate the Scheduler device 2 connected through control lines (18), (20) to the Content Adjustment block (14) and the IDLE Packet Generator (19). The Scheduler device (2) enables transfer of data from any Data Queue (12) into the Output Buffer (9) while adjusting its content via the Content Adjustment block (14). In case of an empty Data Queue (12) or, filling of surplus of output channel bandwidth, the Scheduler (2) may either initiate the generation of an IDLE packet via trigger signal (20), or, fill the remaining bandwidth A with "opportunistic" data provided by a special dedicated Opportunistic Data Queue (112). The Scheduler (2) further may preset the Programmable Clock Generator (4) to the desired clock rate for a Real-Time Output Controller (6) to achieve the desired ChBR. As the Output Buffer (9) provides buffering between the bursty multiplex function and the CBR output channel, the size of the Output Buffer (9) depends upon the actual processing time of the mechanisms performing the scheduling and real-time adjustment tasks. The Scheduler (2) is connected to all real-time devices (i.e., Content Adjuster (14), IDLE Packet Generator (19), and Real-time Output Controller (6)) for controlling and monitoring their real-time activities. The Scheduler (2) is additionally connected to the Host Interface (3), which, in the preferred embodiment shown in FIG. 2, is constructed by utilizing the Shared Data Bus (21).

Further included in the multiplexing system is a Controlling Host (1) which provides all multiplex control functions such as adding and removing QIDs to and from the multiplexed stream, assigning Data Queues (12) to Data Sources by means of the QIDs, and performing content adjustment decisions. The Controlling Host (1) may either be a stand alone application or connected to higher level applications. The interface between the Controlling Host (1) and other function blocks may be implemented either through shared communications or through separate message paths, without changes to the functionality. The Host Interface (3) is used for communication between the Scheduler (2) and the Controlling Host (1), to exchange information concerning adding or removing data sources and their properties, CBR value, QID and allocated Data Queue (12) size. The Scheduler (2) is capable of supporting any number of QIDs and, therefore, Data Queues (12) into the Real-Time Data Output (17), the number of supported QIDs being limited only by the size of the Scheduler (2) memory.

As previously mentioned, the DMA Controller (26) transfers the next packet from the appropriate Data Queue (12) into the Fast Access Buffer (27) upon request from the Scheduler (2) via signal line (29). After completion of the transfer, the real-time mechanism for Content,Adjustment (14) reads, adjusts and writes the complete packet from the Fast Access Buffer (27) to the Output Buffer (9). The Real-Time Output Controller (6) informs the Scheduler (2) of the completion of the transmission of every complete Transport Packet. This enables the Scheduler (2) to remain synchronized with the ChBR and keep accurate timing information via signal line (8).

Figure 3A:
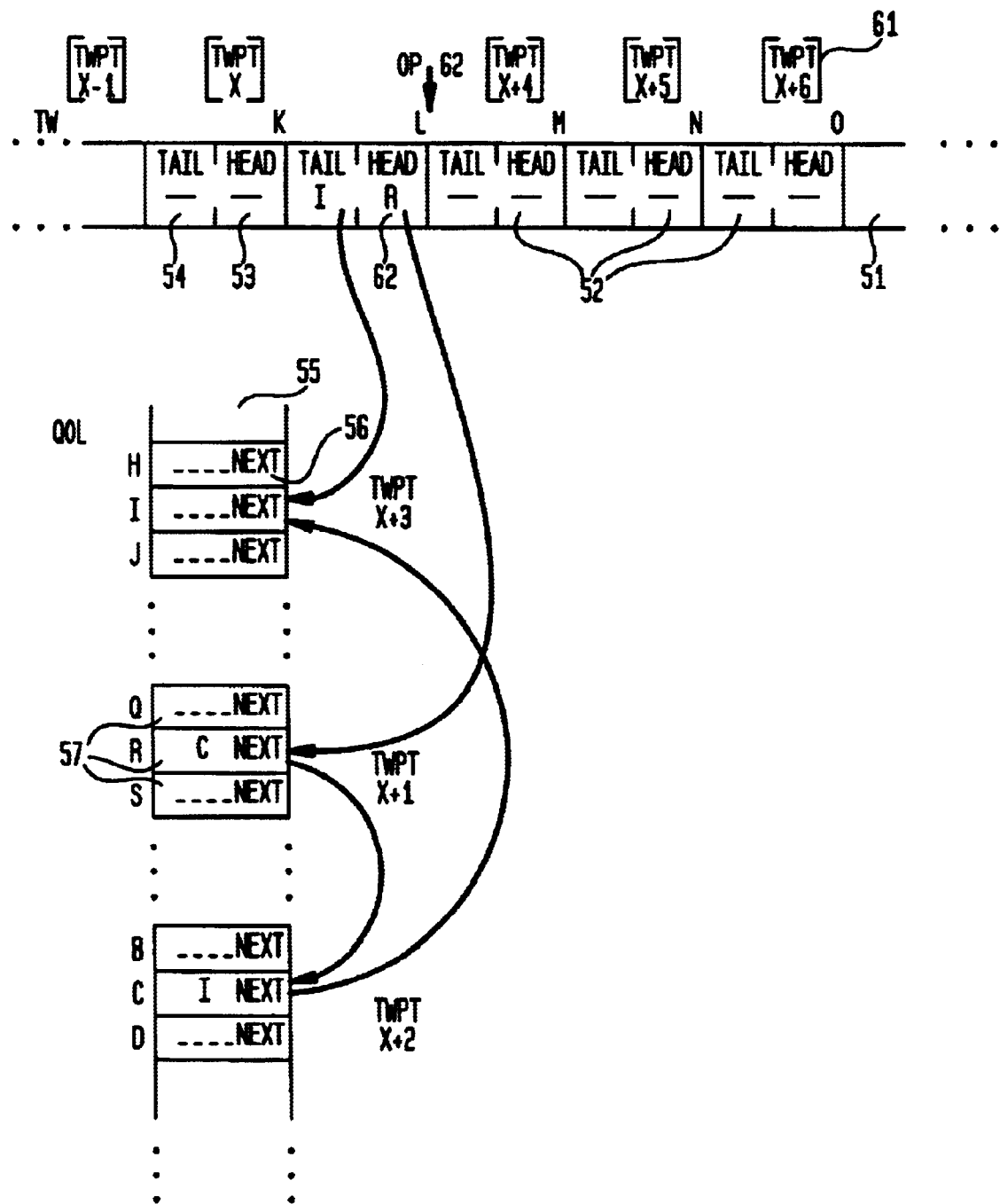
FIGS. 3(a) and 3(b) are diagrams illustrating the time wheel (TW) and queue overflow list (QOL) timing mechanisms implemented by the scheduler device.
Figure 3B:
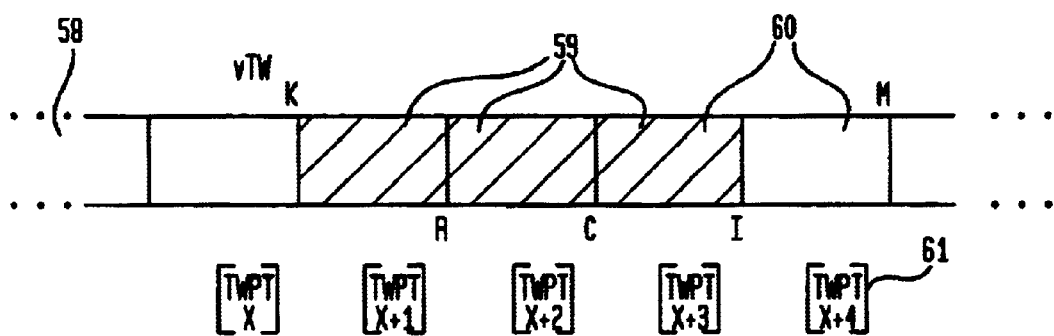

According to the preferred embodiment of the invention, as shown in FIGS. 3(a) and 3(b), the Scheduler function implements two main data structures configured as memory arrays: the first data structure (51) referred to as Time Wheel (TW) with size (TWS); and, the second data structure (55) referred to as the QID Overflow List (QOL) with size (QOLS). The size TWS of the TW depends upon the required periodicity range of the data streams. The TWS value directly relates to the maximum interval between two consecutive instances of one QID on the TW, limiting the minimum data rate to the data rate represented by this interval. Enlarging the TWS value will allow lower data rates. The QOL (55) contains one entry per QID and, therefore, the size of QOLS grows linearly with the number of supported QIDs. The TW function represents a spinning wheel or endless loop, i.e., when the end of the TW array is reached the first item of the TW array is scheduled next. The current position of the TW is included in an Output Pointer (OP) (62), which advances every packet time tick, which interval is referred to as Time Wheel Interval (TWI). A second variable referred to as Time Wheel Periodicity Tracker (TWPT) (61) contains a looping counter with a maximum referred to as Time Wheel Periodicity Tracker Maximum (TWPTM) larger than the sum of the sizes of both arrays.

Every TW entry (52) comprises two pointer fields, labeled HEAD (53) and TAIL (54), both containing either NULL if unused, or a valid QID value pointing to the QOL (55), thus creating a linked QID list. The QOL entries (57) each have a single pointer field, labeled NEXT 56, which include a value similar to the TW pointer fields, i.e., either NULL if unused, or a valid QID value pointing into another QOL entry (57). This enables the TW (51) to comprise variable length unidirectional linked list of QIDs, having a "head" and "tail" indicated by the two pointers (53), (54) contained in the TWE pointing into the QOL (55). For instance, the TW entry "L" in the TW (51) includes a First "head"pointer (53) pointing to QOL entry "R"; the "R" entry in the QOL (55) includes a Next QID value pointing to QOL entry "C"; QOL entry "C" further includes a Next QID value pointing to QOL entry "I"; QOL entry "I" includes a null entry and thus is the "tail" of the linked list as indicated in the last field (54) for the TW entry "L". In this manner, each TWE may dynamically expand between zero and QOLS, therefore, dynamically expanding TWS with a factor between zero and QOLS. The resulting virtual representation of the TW (51) is referred to as Virtual Time Wheel (VTW) (58), as shown in FIG. 3(b) which illustrates the dynamic expansion of the TW entry "L" as comprising R,C and I QID entries (59,60) with the corresponding TWPT entries (61) indicated.

The scheduler advances the TW (51) once per TWI driven by a signal (8) derived from the Real-time Output Controller (6). The TWI value is calculated according to equation (1a) as follows:

$$TWI = \frac{FPS[\text{bits}]}{ChBR[\text{bits}/s]} \tag{1a}$$

As both FPS and ChBR are assigned at Channel Initialization, the TWI value remains constant. Preferably, the TWI value calculated in 27 MHz clock ticks (approximately 37 ns) and is expressed according to equation (1b) as follows:

$$TWI27M = \frac{FPS[\text{bits}] \cdot (27E+6)[27 \text{ Mticks}/s]}{ChBR[\text{bits}/s]} \tag{1b}$$

and stored in two separate fields, a Base field TWIb and an Extension field TWIe, similar to the MPEG-II PCR syntax as described in the ISO/IEC 12818-1 of the MPEG-II Systems standard. The Base part TWIb is calculated according to equation (2a), while the Extension part TWIe is calculated according to equation (2b) as follows:

$$TWIb=TWI27M \; DIV \; 300 \tag{2a}$$

$$TWIe=(TWI27M \; DIV \; 1)\cdot 64 \tag{2b}$$

In order to achieve the required accuracy using a 16-bit micro-controller, all Extension field values such as, for example, TWIe containing values between zero and 300 are multiplied by 64 to make use of the full 16-bit scale of 0 to 65536. Skilled artisans may devise other schemes for conforming to the MPEG-II PCR syntax standard according to a particular hardware implementation.

For every QID added to the TW, an accurate periodicity value TWPa expressed in TWE is generated according to equation (3) as follows:

$$TWPa = \frac{ChBR[\text{bits}/s]}{CBR[\text{bits}/s]} \tag{3}$$

The whole number of TWE of TWPa is expressed in TWP according to equation (4a) as follows:

$$TWP=ChBR \; DIV \; CBR \tag{4a}$$

The decimal part of TWPa is expressed, similar to the expression of TWI, in TWPb calculated according to equation (4b) as follows:

The TWP value calculated in terms of 27 MHz clock ticks is expressed as TWP27M according to equation (4b) as follows:

$$TWP27M = \frac{FPS[\text{bits}] \cdot (27\,E + 6)[27\,\text{Mticks/s}]}{CBR[\text{bits/s}]} \quad (4b)$$

The decimal part of TWPa is expressed, similar to the expression of TWI (equation 2(a)), in TWPb calculated according to equation (4c):

$$TWPb = TWP27M - (TWP \cdot TWI27M))\; DIV\; 300 \quad (4c)$$

and TWPe calculated according to equation (4d), $$TWPe = (64(TWP27M - (TWP \cdot TWI27M)))\; DIV\; 1 \quad (4d)$$

and similar to the MPEG-II PCR syntax expression of TWI.

Initially, all QIDs, TW (51) and QOL (55) entries are empty and the OP and TWPT contain arbitrary values between their minimum and maximum range. Since the TW wraps around, these "initial" values for OP and TWPT may be at any arbitrary value within their range. The Real-Time Output Controller (6) is initialized with the appropriate ChBR by the Scheduler (2). Initial values are calculated and the scheduling process is started. The Real-time Output Controller (6) waits a number of TWI intervals, before the actual transmission is started to allow the Output Buffer (9) to partly fill the required amount of buffering. Whenever the scheduling process takes more than the maximum TWI time, the Output Buffer (9) allows the Real-Time Output Controller (6) to continue without directly violating the MPEG-II Standard. The scheduling mechanism recovers this time by performing several consecutive scheduling activities with processing times smaller than the TWI time, resulting in an average scheduling time below the TWI time. The scheduler determines the Data Queue (12) based upon the Data Queue Identifier (QID) in the HEAD field in the advancing TW. A HEAD field value containing a NULL pointer indicating no Data Queue (12) selection triggers IDLE packet generation by the Real-Time Content Adjustment mechanism (14). The generated IDLE packet is written into the Output Buffer (9). Physical layers such as DVB/SPI, which do not support framing, require the channel to be filled with IDLE data while no actual data is transmitted. Alternately, the Scheduler may trigger transport of "Opportunistic" data derived from the dedicated Opportunistic Data Queue (112) during that TWI.

The Scheduler (2) is invoked every TWI to ensure data availability to the Real-time Output Controller (6), and, therefore, the average computation time for one run of the Scheduler (2) must be under TWI. Since the TW (51) is invoked by the signal given by the Real-time Output Controller (6) upon completion of the transmission of one packet, the Scheduler (2) always remains synchronized with the Real-time Output Controller (6). Since the entire Scheduler (2) is synchronized with this signal, the internal time tracking is based upon this clock and high accuracy and reliability of the Real-time Output Controller (6) is required. Every run of the Scheduler (2) the TWPT is incremented, while the OP is only incremented when the last entry of the list linked through the QOL (55) is removed and the TW (51) is advanced to the next entry. For every QID, the current value of TWPT is stored when scheduling the next entry. Utilizing both the stored and the current TWPT values, the VTW gap is calculated, thus deriving the actual scheduling interval. FIG. 3(b) illustrates a gap for the expanded TW entry "L". The occurrence of a VTW interval larger than the TW interval results in dropping the bit rate for the current scheduled QID referred to as Packet Lateness (PL).

To ensure CBR requirements for the current QID, the drop in bit rate is taken in account in the calculation of an In Point (InP) for the next scheduled packet for this QID, according to equation (5) as follows:

$$IP = (OP + TWP + TWPA - PL)\; \%\; TWS \quad (5)$$

The Time Wheel Periodicity Adjustment (TWPA) value used in equation (5) represents the accumulated part of a TWE as calculated by equation (6) which is set forth as follows:

$$TWPA = \{1:\; (TWPb > TWIb) \cup ((TWPAb = TWIb) \cap (TWPAe \geq TWIe))$$
$$= \{0:\; (TWPAb < TWIb) \cup ((TWPAb = TWIb) \cap (TWPAe \geq TWIe)) \quad (6)$$

Whenever the result of equation (6) is different from zero, the TWPAb and TWPAe values are subtracted with the TWIb and TWIe values, representing an adjustment of one TWE. Equation (5) thus results in an average bit rate equal to the required CBR.

For every QID registered at the scheduler by the controlling host, the associated Data Queue 12 and the required CBR, as translated, are stored. The QID is added to the TW by storing the current TWPT value and calculating the InP value according to equation (5), after which the QID is stored on the HEAD field of the entry indicated by InP. If the entry is already occupied by a QID, the QID is written in the QOL entry indicated by the TAIL field, while updating the TAIL field to the scheduled queue. This effectively results in scheduling at the end of the QOL linked list. When the advancing scheduler reaches this entry, the next available packet of the indicated QID is transferred from the associated Data Queue (12) to the Fast Access Buffer (27) for adjustment and transmission. The entry is then removed from the linked list and the next packet of this queue is scheduled based upon the periodicity and InP values calculated.

While transferring the packet from the Fast Access Buffer (27) to the Output Buffer (9), changes to the packet content may be made. Particularly, in accordance with the implementation of the MPEG-II TS standard and absence of pre-multiplexing mechanism, items such as Packet Identifiers (PID), Continuity Counters (CC) and Program Clock References (PCR) are adjusted in the Real-time Content Adjustment device (14). For clock reference updates, the Scheduler (2) provides the accurate time information. With the MPEG-II TS implementation, the value added to the existing PCR value is calculated using equation (7a) for the PCR Base and (7b) for the PCR Extension fields as follows:

$$PCR\,Adj.(\text{base}) = (PL.TWIb) + TWPAb \quad (7a)$$

$$PCR\,Adj.(\text{extension}) = ((PL.TWIe) + TWPAe)\; DIV\; 64 \quad (7b)$$

When handed to the Real-time Content Adjustment device (14), these values are easily added to create a correct PCR representation for each transport packet. In addition, by handing the QID to the Real-time Content Adjustment device (14), this device can perform Continuity Counter updates and PID re-mapping. One particular PID re-mapping scheme is the subject of commonly-owned, co-pending U.S. patent application Ser. No. 09/447,632 the whole content and disclosure of which is incorporated by reference as if fully set forth herein.

It should be understood that, in the preferred embodiment, all real-time devices described herein are implemented in hardware, except for the functional complex Scheduler device (2), which may be implemented utilizing a 16-bit embedded controller.

Figure 4:
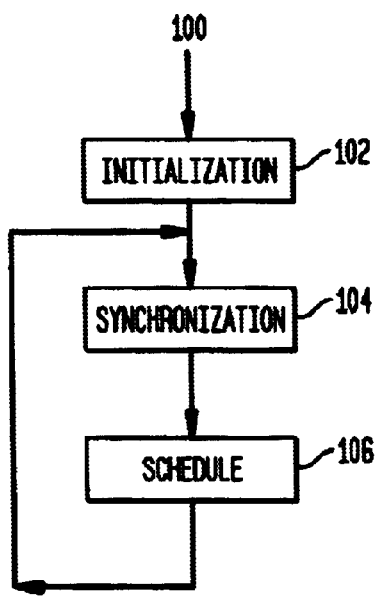
FIG. 4 is a flow chart depicting the general sequence of steps implemented by the demultiplex system of the invention.

Referring now to FIG. 4, there is shown a flow diagram depicting the method 100 of the multiplex system according to the invention. As shown in FIG. 4, the method comprises three successively performed steps including a first initialization step 102 for initializing QIDs, TW (51) and QOL (55) entries and setting the OP at an arbitrary value between its minimum and maximum range. Then at 104, a synchronization step is performed whereby the TS packet arrives for placement at the Output Buffer (9). At the next step 106, the scheduler process is performed in the manner as described with respect to the flow diagram illustrated in FIGS. 5(a) and 5(b). The process then repeats in synchronization for each transport packet to be scheduled by returning to step 104.

Referring now to FIGS. 5(a) and 5(b), there is illustrated the process implemented by the Scheduler (2) for scheduling each transport packet from a data queue that is to be multiplexed onto the transport stream. As indicated at a first step 140, FIG. 5(a), the QID of the packet to be multiplexed is retrieved from the TW slot indicated by the current OP. Then, at step 146, that QID is removed from the TW slot. Next, at step 149, a decision is made as to whether a next QID is present in the QOL (55) (i.e., is there a linked list). If, at step 149, it is determined that a new QID identified with a next packet is present on the QOL (55), then that next QID is removed from the QOL at step 151 and inserted into the next TW slot indicted by the OP at step 153. Then, at step 155, a determination is made as to whether the QID is an active QID. If the QID to which the packet belongs is an active QID, the next step is the performance of an accumulate periodicity adjustment as indicated at step 157 (FIG. 5(b)). This adjustment includes a determination of how late the packet is in relation to the requested scheduled multiplex time. For instance, when packets from a data source (QID) are characterized for transmission at 6 Mbit/sec (CBR) on a 40 Mb/sec channel, it will yield a Time Wheel Entry (TWE) interval of 6.666 expressed in TW (51) time slots. The first packet for this stream is always scheduled at a precise slot with the second packet scheduled somewhere in the middle of a slot. However, in compliance with the MPEG-II standard which does not permit early scheduling, the next packet may be scheduled in the next available whole number slot which is virtually late, e.g., (7–6.666 $\mu$s=0.333 $\mu$s). This is repeated for each packet with the lateness accumulating with each received packet. This adjusted lateness of the scheduling time has to be continuously tracked for proper data rate allocation.

After the periodicity adjustment is accumulated, the process continues at step 159 where the PCR delta is calculated in accordance with the calculations provided in equations (7a) and (7b). Then, at step 161, the PCR delta is handed off to the Content Adjuster (14) so that the correct PCR representation for each transport packet is provided prior to forwarding of the packet to the Output Buffer (9). Then, at step 163, the next QID is rescheduled on the TW (51) at the IP position calculated in accordance with equation (5). At step 165, the virtual ETA for the next packet to be multiplexed is calculated for the next scheduled TW slot (associated with that QID) for internal storage within the scheduler. Then, at step 169, a determination is made as to whether any QID is present on the TW slot pointed to by the OP. If a QID is not present on the TW slot pointed to by the OP, then at step 172, the OP is incremented, i.e., advanced to the next slot (See FIG. 3(a)). Otherwise, if a QID is present, then at step 175, the VTW tracker 58 (FIG. 3(b)) is incremented so that the real TW Slot intervals are tracked. The process then proceeds back to the synchronization step in FIG. 4, for the next scheduling interval.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for multiplexing transport packets associated with one or more data sources for transmission over a shared fixed bit rate medium, at least one data source required to transmit packets at an associated Constant Bit Rate (CBR), said method including:

a) storing transport packets associated with a data source within a data queue memory storage device associated with a respective data source, each data queue memory device having an associated queue identifier (QID);

b) maintaining timing information comprising plurality of time intervals and scheduling a time interval for each QID having a transport packet to be multiplexed on said shared medium based on a required CBR for said data source and said fixed bit rate medium;

c) tracking in real-time time intervals associated with said fixed bit rate and determining from a current time interval a transport packet associated with said QID to be multiplexed;

d) determining a time offset indicating a difference between the scheduled time interval for said transport packet and an actual time of multiplexing said transport packet; and, e) updating said timing information for a next transport packet to be multiplexed from the associated QID based on said determined time offset and an associated CBR of said data source.

2. The method as claimed in claim 1, further including the step of adjusting a timestamp information associated with a transport packet prior to multiplexing said transport packet.

3. The method as claimed in claim 2, wherein a single time interval includes two or more scheduled QIDs having transport packets to be multiplexed, said scheduling step further including the steps of:

virtually expanding said single time interval to include two or more successive time intervals each including a re-scheduled QID transport packet to be multiplexed according to said timing information maintained; and, updating said timing information to include a linked list indicating said successive re-scheduled packet multiplex intervals.

4. The method as claimed in claim 3, wherein said tracking step further includes the steps of:

retrieving a queue ID from said timing information as real time is elapsed; and removing a queue ID from said timing information as a packet associated with a data source is multiplexed.

5. The method as claimed in claim 2, further including the step of:

synchronizing said pointer for tracking real time elapsed time intervals with said fixed bit rate.

6. The method as claimed in claim 1, wherein said tracking step c) includes the steps of providing a pointer for advancing in real-time said time intervals corresponding to said fixed bit rate.

7. The method as claimed in claim 1, wherein said step c) further includes the step of identifying whether a time interval includes a packet to be multiplexed, and generating an IDLE packet for multiplexing onto said fixed bit rate medium when no transport packet associated with a time interval is scheduled.

8. The method as claimed in claim 1, wherein said step c) further includes the step of identifying whether a time interval includes a packet to be multiplexed, and multiplexing data from a data source not associated with a QID for multiplexing onto said fixed bit rate medium when no transport packet associated with a time interval is scheduled.

9. The method as claimed in claim 1, wherein scheduled multiplex QIDs are stored in said timing information at whole number time unit intervals, said step of determining a time offset further including the step of:

accumulating periodicity adjustment of said timing information for QIDs of transport streams packets characterized as having a CBR that is not an integral multiple of said fixed bit-rate.

10. A system for multiplexing Constant Bit Rate (CBR) encoded content for transmission over a fixed bit rate medium, said content including fixed size packets associated with one or more data sources for transmitting streams at an associated CBR, said system including:

a) data memory means associated with a respective data source for storing transport packets associated with each data source, each data memory means having an associated queue identifier (QID);

b) real-time output control means for enabling multiplexing of a transport packet from said data memory means according to said fixed bit rate; and, c) scheduler means in synchronization with said real-time output control means for scheduling a QID associated with said transport packet to be multiplexed based on a required CBR for said data source providing said transport packet and said fixed bit rate, and initiating transport packet multiplexing at said real-time output control means, said scheduler means including means for determining a time offset indicating a difference between a scheduled time interval for said QID and an actual time of multiplexing said transport packet, wherein said scheduling means updates timing information for a next transport packet to be multiplexed from the associated QID based on said determined time offset.

11. The system as claimed in claim 10, further including content adjuster means in communication with said scheduling means for adjusting a timestamp information associated with a transport packet prior to multiplexing said transport packet.

12. The system as claimed in claim 11, wherein said scheduling means includes real time tracking means for tracking real-time time intervals associated with said fixed bit rate and determining from a current time interval a scheduled transport packet associated with said QID to be multiplexed.

13. The system as claimed in claim 12, wherein a single time interval includes two or more scheduled QIDs having transport packets to be multiplexed, said real time tracking means further including: means for virtually expanding said single time interval to include two or more successive time intervals each interval including a re-scheduled QID transport packet to be multiplexed according to said timing information said scheduling means updating said timing information to include a linked list indicating said successive re-scheduled packet multiplex intervals.

14. The system as claimed in claim 13, wherein said scheduling means further includes means for retrieving a queue ID from said timing information as real time is elapsed and removing a queue ID from said timing information as a packet associated with a data source is multiplexed.

15. The system as claimed in claim 13, wherein scheduled multiplex QIDs are stored in said timing information at whole number time unit intervals, said means for determining a time offset further including means for accumulating periodicity adjustment of said timing information for QIDs of transport streams packets characterized as having a CBR that is not an integral multiple of said fixed bit-rate.

16. The system as claimed in claim 12, wherein said
content adjuster means includes means for generating an IDLE packet for multiplexing onto said fixed bit rate medium when no transport packet associated with a time interval is scheduled at a current time interval.

17. The system as claimed in claim 12, further including a data source not associated with a QID having a transport packet for multiplexing onto said fixed bit rate medium when no transport packet associated with a time interval is scheduled.

* * * * *